United States Patent Office 3,342,663
Patented Sept. 19, 1967

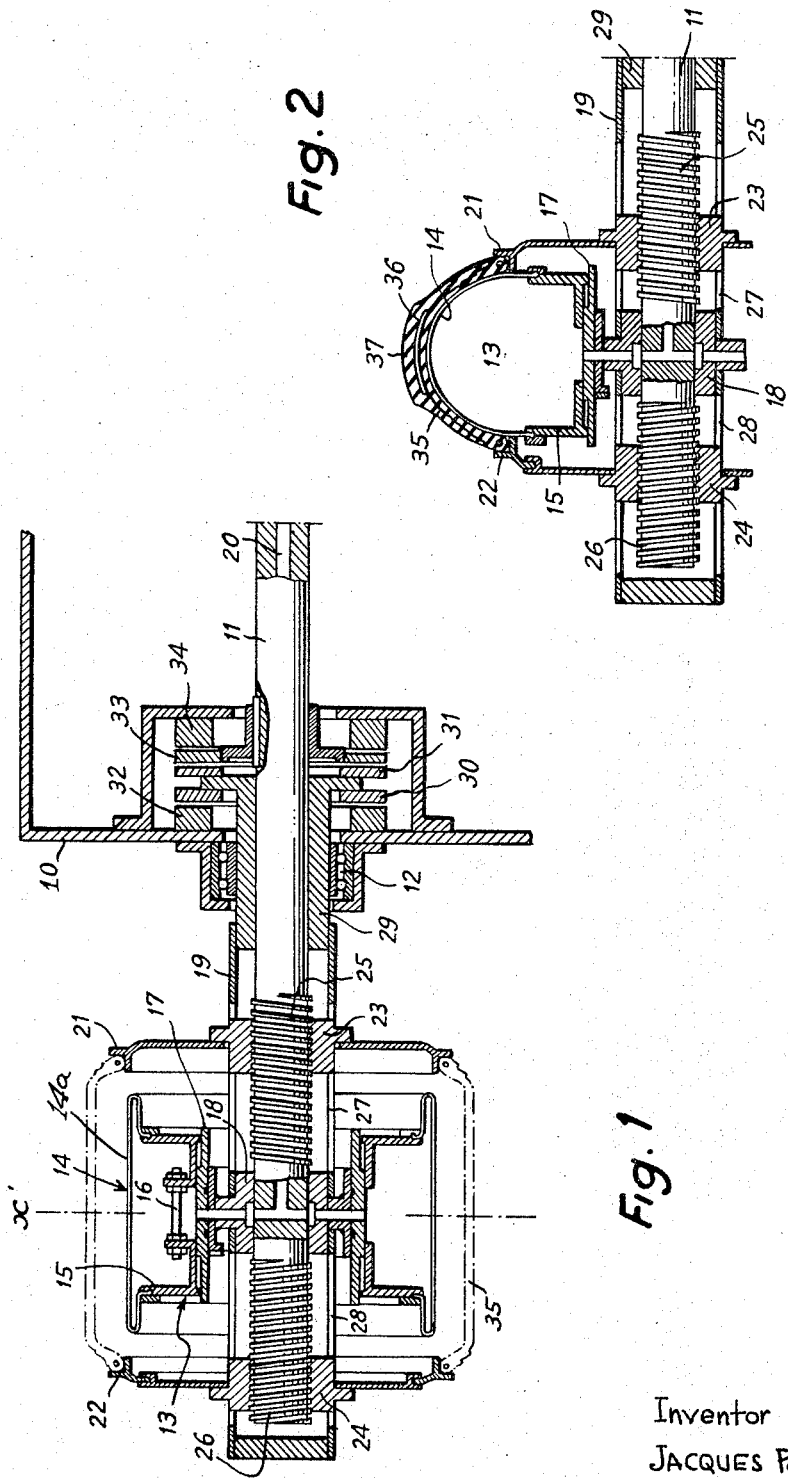

3,342,663
MACHINE FOR SHAPING PNEUMATIC TYRES
Jacques Pouilloux, Saint Gratien, France, assignor to Pneumatiques, Caoutchouc Manufacture et Plastiques Kleber Colombes, Colombes, Seine, France, a corporation of France
Filed Dec. 28, 1964, Ser. No. 421,217
Claims priority, application France, Dec. 26, 1963, 958,571
9 Claims. (Cl. 156—416)

ABSTRACT OF THE DISCLOSURE

A machine for shaping and finishing a tyre comprises a drum axially fixed with a cylindrical surface formed by a flexible diaphragm reinforced with inextensible longitudinal cables and fixed by its edges along two circumferences, fixed and axially spaced by a distance equal to the distance between the beads of the shaped tyre. Movable rings symmetrical on both sides of the drum ensure the holding and centering of the beads of the tyre during shaping. The machine enables regular shaping to be achieved by exerting on the tyre a sufficient but not excessive pressure.

---

The present invention relates to a machine for curving i.e., shaping the carcasses or skeletons of tyres which have been assembled on assembly drums having a generally cylindrical shape according to the "flat band" method. In the case of tyres with an inextensible breaker layer this machine allows the carcass to be curved and the tyre then to be finished by locating the breaker layer and the tread.

Machines known as "shapers" are already known in which the cylindrical carcass or skeleton of the tyre is shaped by means of an annular air chamber of rubber resting upon a cylindrical sleeve or ferrule. This air chamber is inflated while the beads of the tyre are brought symmetrically together.

Tyre assembling and shaping machines are also known, which comprise a drum, the cylindrical surface of which is constituted by a flexible annular diaphragm secured by its edges to the circular plates of the drum. These machines allow the carcass of the tyre to be assembled on a cylindrical surface of the diaphragm stretched between the separated plates, and then for this carcass to be shaped by radially extending the diaphragm by means of compressed air while the plates are brought together.

When the air chamber or the diaphragm of one of these known machines is constituted only of rubber it is difficult exactly to control radial expansion, and if expansion is excessive, there is a risk of the canvasses of the carcass being displaced with respect to the wires of the tyre beads. A means of limiting this extension of the diaphragm consists in effecting the shaping within a rigid bell-shaped housing, but this complicates the structure of the machine and hampers any finishing operations to be carried out on the shaped tyre. Another means of limiting the expansion of the diaphragm consists in reinforcing it with longitudinal inextensible cables. It has, however, been found that if these cables are of suitable length when the drum is in the cylindrical position for tyre assembly, the extension of the diaphragm is then insufficient at the moment of shaping in order correctly to stretch the fabrics of the carcass. It has thus been necessary to take certain measures to increase to a limited extent the expansion of the tyre in the shaped position.

The invention has for its object a machine allowing the carcasses or skeletons of tyres to be shaped to an exact size, by exerting on the carcass or the tyre a sufficient but not excessive tension to avoid the defects produced in either case, without it being necessary to use means such as an external bell-shaped housing.

According to the invention, a machine for this purpose comprises a cylindrical drum, the external surface of which is formed by a tubular diaphragm reinforced with inextensible longitudinal cables and which may be radially expanded by the admission of compressed air into the drum, and is characterised in that the tubular diaphragm is secured by its side edges to the drum at points spaced axially from each other by a distance substantially equal to the distance of the beads of the tyre after curvature, symmetrically movable centring and securing rings for the tyre beads being located on either side of fixed securing points on the edges of the diaphragm used for shaping.

The securing of the edges of the diaphragm at points at a fixed distance from one another, said distance being substantially equal to the spacing of the tyre beads after curvature, allows a very accurate diaphragm length to be selected in order to obtain optimum tension on the tyre at the moment of shaping. Because this diaphragm is inextensible in a longitudinal direction, there is no risk of its radial expansion being excessive although no external bell-shaped housing is used. Furthermore the controlled moving together is symmetrical with respect to the beads of the tyre, and a well balanced tensioning of the carcass results.

Other features of the invention will become apparent in the course of the description which follows, reference being made to the accompanying drawings which show one embodiment by way of example and in which:

FIGURES 1 and 2 are elevational sectional views of a machine at the beginning and at the end of the operation.

Referring to the drawings the machine shown comprises a frame 10 in which is mounted a horizontal shaft 11 projecting from one side of the frame. The shaft is held at one side in a bearing 12 and at its right-hand end by another bearing (not shown).

Outside the frame 10 the shaft 11 carries a shaping drum, and generally referred to as 13, the external surface of which is formed by a tubular diaphragm 14 of rubber reinforced with inextensible longitudinal cables 14a of textile or metal.

The side edges of the diaphragm 14 form beaded edges fixed by means of small rings to the annular rigid plates 15 of the drum. These rigid plates 15 are spaced from each other in an axial direction by a distance substantially equal to the separation by which the tyre beads must be located after shaping. This spacing may be adjusted for example by screwing the plates 15 to a cylindrical supporting member 17. After adjustment of the spacing, the plates 15 are locked in position by the bolt 16. The cylindrical support is itself mounted upon a central hub 18 carried by the shaft 11, in such a manner that the assembly constituted by the supporting member 17, the plates 15 and the diaphragm 14 may be replaced by an assembly of different size when it is necessary to shape tyres having a different rim diameter.

The central hub 18, and consequently the drum assembly 13, is mounted to rotate freely on the shaft 11. The drum is, however, axially fixed with respect to the shaft. The drum 13 is thus held fixed with respect to a median transverse plane XX′.

The internal area of the drum 13 is sealed by the diaphragm 14 and by the interposition of joints between the plates 15 and the cylindrical support 17. This internal area is in communication with an axial channel or bore 24 through the shaft 11, by means of radial channels which open out into an annular groove of the hub 18, which allows compressed air to be conveyed into the drum 13 in order to expand the diaphragm, or, on the other hand, to allow for evacuation of the compressed air and, if desired, a vacuum to be produced in order to draw the diaphragm 14 to the level of the external diameter of the plates 15 or between said plates.

On either side of the drum 13 are located rings 21, 22 having bevelled edges for securing and de-centring the beads of the tyre to be curved. The internal ring 21 is fixed with respect to its supporting web, while the outer ring 22 is removable from its supporting web so as to allow for the assembly and dismantling of the tyre. The ring 22 may be secured to its supporting web by any suitable means, for example bolts, bayonet securing means or the like.

The securing and centring rings 21 and 22 are respectively connected by means of their supporting web to nuts 23, 24 screwed onto two threaded portions 25 and 26 of the shaft, having the same pitch but of opposite hand. These nuts pass through the wall of a tubular sheath 19 co-axial with the shaft by means of longitudinal grooves 27 and 28 located on either side of the median plane $xx'$. This sheath 19 is axially fixed with respect to the drum 13 due to the fact that its wall is traversed by radial extensions of the hub 18 of the drum. In this manner when the shaft 11 is rotated and the sheath 19 remains fixed, the nuts 23 and 24 are moved together or apart symmetrically and drive the rings 21 and 22 in the same movement.

The shaft 11 is rotated by an electric motor (not shown) located within the frame 10. The sheath 19 may either be fixed against rotation or be rotatable at the same time as the shaft 11. To this end, the sheath 19 is connected at its end to the sleeve 19 rotating freely on the shaft 11 and in the bearing 12. This sleeve has a flange which carries on either side a reinforcement plate 30, 31. The plate 30 may be drawn against an electric brake 32 secured to the frame and which immobolizes the sleeve 29 and the sheath 19 whilst allowing the shaft 3 to rotate.

In order to make the sheath and the shaft rotatable together, the plate 31 is drawn against the disc 33 of an electric clutch 34, said disc 33 being secured to the shaft 11.

In this position the plate 30 is withdrawn from the brake 32. The sheath 19 is then rotated at the same time as the shaft 11 and it rotates with it the assembly of the shaping drum 13 and the centring rings 21, 22.

The machine herein described operates as follows. Starting from a position shown in FIGURE 1, the external ring 22 is removed in order to locate the carcass 35 of the tyre which has previously been assembled in a cylindrical form. The ring 22 is then replaced and the drum 13, together with the rings 21 and 22, are fixed against rotation by means of the brake 32 while the shaft 11 is caused to rotate. The threaded portion 25 and 26 of the shaft symmetrically draw together the nuts 23 and 24 and with them the rings 21 and 22. At the same time compressed air is conveyed through the bore 20 in the shaft into the drum in order to expand the diaphragm 14. This diaphragm comes into contact with the internal surface of the carcass and ensures its regular shaping. At the end of the operation the diaphragm 14 has expanded as shown in FIGURE 2 and the rings 21 and 22 are at their nearest point to said diaphragm. This position may be determined in a manner known per se by using end-of-travel contact members which cut out the electric motor. As has been stated above, the expanded length of the diaphragm 13 between its securing points may be selected in a very accurate manner in order to obtain optimum tension on the carcass when in the curvature position.

When the tyre produced is of the ordinary type the curved skeleton is removed after the diaphragm 14 has been brought into the position shown in FIGURE 1 and the tyre is then vulcanised. If the tyre is of the type having an inextensible breaker layer, the breaker layer 36 may be positioned on the curved carcass. The tread 37 is then located and the tyre is removed as hereinbefore described. In both cases the drum assembly may be turned with the shaped tyre thus exciting the clutch 34 in order to effect certain finishing operations on the shaped tyre.

The invention is, of course, not limited to the invention hereinbefore described by way of example, and various modifications may be made to the specific details set forth within the limits of the appended claims.

I claim:
1. A machine for shaping and finishing a pneumatic tyre, comprising a drum having its cylindrical surface formed by a tubular diaphragm which can be radially expanded by the admission of compressed air into the drum, said diaphragm being reinforced with inextensible longitudinal cables, means for securing said tubular diaphragm along its circumferences, the planes of said circumferences being separated along their common axis by a distance substantially equal to the distance between the beads of the tyre after shaping, symmetrically movable securing and centring rings for the beads of the tyre, and means for axially moving said rings to and from said planes and for axially securing said rings.

2. A machine as set forth in claim 1, comprising further a hollow centre shaft, means for mounting said drum free to rotate about said shaft but axially fixed with respect thereto, said central shaft communicating with the interior of said drum for the intake of compressed air under the shaping diaphragm, and means for rotating said shaft and for securing said drum in rotation and fix said drum against rotation with respect to the shaft.

3. A machine as set forth in claim 2, wherein said central shaft has on either side of the median symmetrical plane of the drum, portions threaded in an opposite direction which engage respectively with nuts integral with said securing and centring rings, and a tubular sheath surrounding said central shaft, said nuts and said drum being rotatable with said sheath.

4. A machine as set forth in claim 3, and comprising further means for securing said drum to rotate about said shaft.

5. A machine as set forth in claim 3, and comprising further, means for fixing said drum against rotation about said shaft.

6. A machine as set forth in claim 3, wherein said tubular sheath is longitudinally grooved on either side of said drum, said nuts being axially guided in said grooves.

7. A machine as set forth in claim 2, wherein said central shaft is secured to an electric clutch disc, and said means for rotating said shaft includes a sheath surrounding said shaft and rotatable with a plate which is movable towards and away from said disc and fixable against rotation by means of a brake.

8. A machine as set forth in claim 2, wherein said drum comprises a central hub mounted upon said shaft, and comprising further, an annular chamber movable with respect to said central hub.

9. A machine as set forth in claim 1, wherein said drum is laterally defined by adjustably separable rigid plates.

References Cited

UNITED STATES PATENTS

| | | | |
|---|---|---|---|
| 1,289,775 | 12/1918 | Hopkinson | 18—2 |
| 1,982,860 | 12/1934 | Desautels | 18—2 X |
| 3,101,289 | 8/1963 | Giletta et al. | 156—416 X |
| 3,111,445 | 11/1963 | Pouilloux et al. | 156—416 |
| 3,138,510 | 6/1964 | Hindin et al. | 156—416 X |
| 3,235,435 | 2/1966 | Pouilloux | 156—416 X |

J. SPENCER OVERHOLSER, *Primary Examiner.*